United States Patent
Prentice et al.

(10) Patent No.: US 6,688,458 B2
(45) Date of Patent: Feb. 10, 2004

(54) SYSTEM AND METHOD FOR CONTROLLING A CONVEYOR SYSTEM CONFIGURATION TO ACCOMMODATE DIFFERENT SIZE SUBSTRATES

(75) Inventors: Thomas C. Prentice, Westford, MA (US); Brian P. Prescott, Fremont, NH (US); Greg Bouvier, Haverhill, MA (US)

(73) Assignee: Speedline Technologies, Inc., Franklin, MA (US)

( * ) Notice: Subject to any disclaimer, the term of this patent is extended or adjusted under 35 U.S.C. 154(b) by 85 days.

(21) Appl. No.: 09/973,448

(22) Filed: Oct. 9, 2001

(65) Prior Publication Data

US 2003/0066734 A1 Apr. 10, 2003

(51) Int. Cl.[7] .............................................. B65G 43/00
(52) U.S. Cl. ................................ 198/502.2; 198/502.1; 198/861.1; 198/817
(58) Field of Search ........................ 198/502.2, 502.1, 198/861.1, 817

(56) References Cited

U.S. PATENT DOCUMENTS

| | | | |
|---|---|---|---|
| 4,176,455 A | 12/1979 | Copeland et al. | ............. 33/1 M |
| 4,835,710 A | 5/1989 | Schnelle et al. | ............. 364/513 |
| 4,838,515 A | 6/1989 | Prentice | ....................... 248/661 |
| 4,979,093 A | 12/1990 | Laine et al. | ............ 364/167.01 |

(List continued on next page.)

FOREIGN PATENT DOCUMENTS

| | | |
|---|---|---|
| CH | 667 631 A5 | 10/1988 |
| DE | 42 34 675 A1 | 4/1993 |
| EP | 0 278 457 | 8/1988 |
| EP | 0 508 130 A1 | 10/1992 |
| EP | 0 700 733 A1 | 3/1996 |
| FR | 2 398 937 | 2/1979 |
| FR | 2 621 715 | 4/1989 |
| GB | 2 292 598 A | 2/1996 |

OTHER PUBLICATIONS

Ing et al., "The Hexapod principle"; Laboratory for Machine Tools and Production Engineering at Aachen University of Technology; 9 pgs.
Hexel Corporation brochure, "Hexel's Hexapod Solutions"; 4 pgs.
Cooke, A. et al., "Advanced Reconfigurable Machine for Flexible Fabrication"; 1995 North American Conference on Smart Structures and Materials; San Diego, CA; Feb. 26–Mar. 3, 1995; 14 pgs.
Patent Abstracts of Japan,;JP 08298394 (Tescon KK); Dec. 11, 1996; 1 pg.

(List continued on next page.)

Primary Examiner—Christopher P. Ellis
Assistant Examiner—Rashmi Sharma
(74) Attorney, Agent, or Firm—Mintz, Levin, Cohn, Ferris, Glovsky and Popeo, P.C.

(57) ABSTRACT

A rail position control system is provided that controls a conveyor system configuration to accommodate a plurality of differently sized substrates in an apparatus. The rail position control system includes at least one camera, which is mounted on a mounting surface located in close proximity to the conveyor system. The rail position control system further includes a computer system that is operatively coupled to the camera and to a motor. The motor is further coupled to at least one rail of the conveyor system. The camera is operative to view and provide a plurality of images of a conveyor lane width value to the computer system. The conveyor lane width value represents a space located between at least one pair of rails of the conveyor system. The computer system responds by processing the plurality of images of the conveyor lane width value to generate a rail position adjustment value, which is communicated, via control signals, to the motor to actuate the motor to move the at least one rail a distance representing the rail position adjustment value.

17 Claims, 5 Drawing Sheets

U.S. PATENT DOCUMENTS

| | | | |
|---|---|---|---|
| 5,092,021 A | 3/1992 | Buzzi | 29/38 C |
| 5,097,577 A | 3/1992 | Buzzi et al. | 29/38 R |
| 5,213,559 A | 5/1993 | Lunazzi | 483/14 |
| 5,378,282 A | 1/1995 | Pollard | 118/697 |
| 5,486,151 A | 1/1996 | Bergmann et al. | 483/1 |
| 5,534,067 A * | 7/1996 | Fulker et al. | 118/681 |
| 5,645,158 A * | 7/1997 | Polka et al. | 198/812 |
| 5,807,044 A | 9/1998 | Watari et al. | 409/183 |
| 5,823,316 A * | 10/1998 | Shaw et al. | 198/341 |
| 5,886,494 A | 3/1999 | Prentice et al. | 318/625 |
| 5,903,125 A | 5/1999 | Prentice et al. | 318/625 |

OTHER PUBLICATIONS

Patent Abstracts of Japan; JP 05090799 (TDK Corp.); Sep. 4, 1993; 1 pg.

PCT International Search Report date Apr. 19, 1999.

* cited by examiner

SYSTEM AND METHOD FOR CONTROLLING A CONVEYOR SYSTEM CONFIGURATION TO ACCOMMODATE DIFFERENT SIZE SUBSTRATES

FIELD OF THE INVENTION

The present invention relates generally to a system and method for controlling a conveyor system to accommodate differently sized substrates. More specifically, the present invention relates to a system and method for adjusting conveyor rails of a conveyor system in a dispensing system to accommodate differently sized substrates.

BACKGROUND

There are several types of prior art dispensing systems used for dispensing metered amounts of liquid or paste for a variety of applications. One such application is in the assembly of printed circuit boards and integrated circuit chips. In this application, dispensing systems are used in the process of encapsulating integrated circuits with an encapsulating material and in the process of underfilling flip integrated circuit chips with an encapsulant. Prior art dispensing systems are also used for dispensing dots or balls of liquid epoxy or solder paste onto circuit boards and integrated circuits. The liquid epoxy and solder is used to connect components to a circuit board or to an integrated circuit. The dispensing systems described above include those manufactured and distributed by Speedline Technologies, Inc., assignee of the present invention, under the name CAMALOT™.

The dispensing systems described above are typically used in an electronics manufacturing facility in an automated assembly line with other equipment used in a circuit board or integrated circuit manufacturing process. The other equipment in-line with the dispensing systems may include, for example, pick and place machines, which place components on circuit boards, or reflow ovens that are used to cure materials dispensed onto the circuit boards or integrated circuits.

In a typical dispensing system, a pump and dispenser assembly is mounted to a moving assembly for moving the pump and dispenser assembly along three mutually orthogonal axes (x, y, z) using servomotors controlled by a computer system or controller. To dispense a dot of liquid on a circuit board at a desired location, the pump and dispenser assembly is moved along the horizontal x and y axes until it is located over the desired location. The pump and dispenser assembly is then lowered along the vertical z axis until the nozzle of the pump and dispenser assembly is at an appropriate dispensing height over the board. The pump and dispenser assembly dispenses a dot of liquid, is then raised along the z axis, moved along the x and y axes to a new location, and is lowered along the z axis to dispense the next liquid dot.

During the manufacture of circuit boards, a conveyor system is typically employed to transport the circuit boards through several processing stations associated with the dispensing system. It is sometimes necessary, or desirable, to process differently sized circuit boards. As a result, spacing between conveyor rails of the conveyor system requires adjustment. Typically, an operator of the dispensing system is required to physically move the conveyor rails to adjust the spacing of the rails to accommodate the differently sized circuit board. In this arrangement, the operator is required to re-adjust the spacing of the conveyor rails each time a differently sized circuit board is transported on the conveyor rails of the conveyor system.

One deficiency with requiring an operator to re-adjust the conveyor rails of the conveyor system, as described above, relates to reduced output of the circuit board manufacturing process. In particular, the circuit board manufacturing process needs to be stopped for a period of time to enable the operator to re-adjust the spacing of the conveyor rails. Stopping the circuit board manufacturing process for a period of time significantly reduces volume production and adds significant costs to the final products produced. Another deficiency of this re-adjustment requirement is related to operator error. If the operator fails to precisely space the rails of the conveyor system, the circuit boards can either fall off of the conveyor system (e.g. rails spaced to far apart) or the circuit boards can become jammed in other machinery associated with the conveyor system (e.g. rails spaced to close together).

Some conveyor systems include motorized rails for reducing operator intervention during the process of re-adjusting rails of the conveyor system. In this type of conveyor system, for example, a motor is coupled to at least a first rail of the conveyor system. The motor is used to move the first rail relative to an adjacently positioned second rail to adjust a space between the first rail and the second rail to accommodate different size circuit boards. In operation of this conveyor system, the motor is initially controlled to move the first rail to a reference position. The motor is thereafter controlled to move the first rail from the reference position to a position for carrying the circuit boards, which is a predetermined distance from the reference position. The predetermined distance for which the first rail is moved is typically measured by an encoder that is coupled to the motor.

One deficiency with this type of conveyor system relates to the time required to initialize the position of the first rail during system start-up, after a power loss or after a system reset. Other deficiencies with this type of conveyor system can occur if the conveyor system includes multiple conveyor lanes. The multiple lane conveyor system can include a plurality of pairs of rails, for which some or all of the rails may require initial positioning at the reference position, as previously described. Further, during the course of operations using the multiple lane conveyor system it may become necessary to re-adjust fewer than all of the lane widths, which would require fewer than all of the motorized rails to return to the reference position and then move to an operating position.

One deficiency occurs in that adjacent lanes that do not require lane re-adjustment may be positioned intermediate the lane that requires re-adjustment and the reference position, thus blocking the motorized rail from moving to the reference position without disturbing the operating position of the adjacent lanes that do not require lane re-adjustment.

Therefore, a need exists for a control system and method for controlling a conveyor system to precisely adjust conveyor rails of the conveyor system to accommodate differently sized substrates, which overcomes the deficiencies and limitations described above.

SUMMARY OF THE INVENTION

Embodiments of the present invention provide a control system and method for controlling a conveyor system configuration to precisely adjust conveyor rails of the conveyor system to accommodate differently sized substrates.

In accordance with one aspect of the present invention, an apparatus for performing a task on a work piece is provided. The apparatus includes an object that performs the task on the workpiece, a work surface, a conveyor system mounted on the work surface and having at least a first rail and at least a second rail separated by a first space equal to a first conveyor lane width value, a support structure coupled to the work surface, the support structure being coupled to the object to support the object over the conveyor system, at least one camera mounted on the support structure, and a processor coupled to the at least one camera. The at least one camera is constructed and arranged to capture a first image of a first registration mark associated with the first rail and to capture a second image of a second registration mark associated with the second rail and to provide the first and second images to the processor. Further, the processor is programmed to receive the first and second images and determine the first conveyor lane width value.

The conveyor system can further include at least a third rail and at least a fourth rail separated by a second space equal to a second conveyor lane width value. The at least one camera can be constructed and arranged to capture a third image of a third registration mark associated with the third rail and to capture a fourth image of a fourth registration mark associated with the fourth rail and to provide the third and fourth images to the processor to determine the second conveyor lane width value. The first registration mark can be located at a first predetermined position on the first rail and the second registration mark can be located at a second predetermined position on the second rail. The apparatus can further include a motor coupled to the processor and to the first rail, the motor being adapted to receive and respond to control signals provided by the processor to move the first rail a distance based on a first conveyor lane adjustment value generated by the processor. The apparatus can further include at least one gantry system having a slidably mounted platform adapted to securely hold the object and to move the object over work pieces on the conveyor system. The platform can be further adapted to securely hold the at least one camera and to move the at least one camera over the conveyor system. The object can include a material dispensing head.

Another aspect of the present invention is directed to a method of controlling a conveyor system configuration, having a first rail and a second rail, to accommodate a plurality of differently sized substrates. The method includes positioning a camera to capture at least one image of the conveyor system, determining a distance between the first rail and the second rail based at least in part on the at least one image, comparing the distance determined with a desired distance, and moving at least one of the first rail and the second rail to set the distance substantially equal to the desired distance.

The method can include positioning a camera to a first position over the first rail to capture an image of the first rail, and positioning the camera to a second position over the second rail to capture an image of the second rail. The step of determining a distance can include determining a distance between the first position and the second position.

Another aspect of the present invention is directed to an apparatus that positions an object to perform a task on a work piece. The apparatus includes the object, a work surface, a support structure positioned over the work surface and constructed and arranged to support the object over the work surface, a conveyor system mounted on the work surface and having at least a first rail and at least a second rail separated by a first space equal to a conveyor lane width, and means for viewing the conveyor system and for determining the conveyor lane width.

The apparatus can further include means for moving at least one of the first rail and the second rail to adjust the conveyor lane width. The means for viewing the conveyor system and for determining the conveyor lane width can include a camera and means for moving the camera to a first position over the first rail and to a second position over the second rail. The means for viewing the conveyor system and for determining the conveyor lane width can include means for determining a distance between the first position and the second position.

BRIEF DESCRIPTION OF THE DRAWINGS

The foregoing and other objects of the present invention, the various features thereof, as well as the invention itself, can be more fully understood from the following description, when read together with the accompanying drawings in which.

DETAILED DESCRIPTION

For purposes of illustration, embodiments of the present invention will now be described with reference primarily to a rail position control system and method for adjusting conveyor rails of a conveyor system to accommodate differently sized substrates, which are transported through a multiple head dispensing system. However, those skilled in the art will appreciate that embodiments of the present invention are not limited to multiple head dispensing systems, but can include single head dispensing systems or other systems in which a work device is used to perform some task on a substrate or product. Examples of such systems include test and measuring systems, component placement systems, inspection systems and machining systems, such as milling machines. In addition, embodiments of the present invention may include a number of different types of work devices within one system. For example, a system may include a dispensing head, a vision inspection system, and a component placement head, each of which may be positioned independently using its own gantry system.

Figure 1:
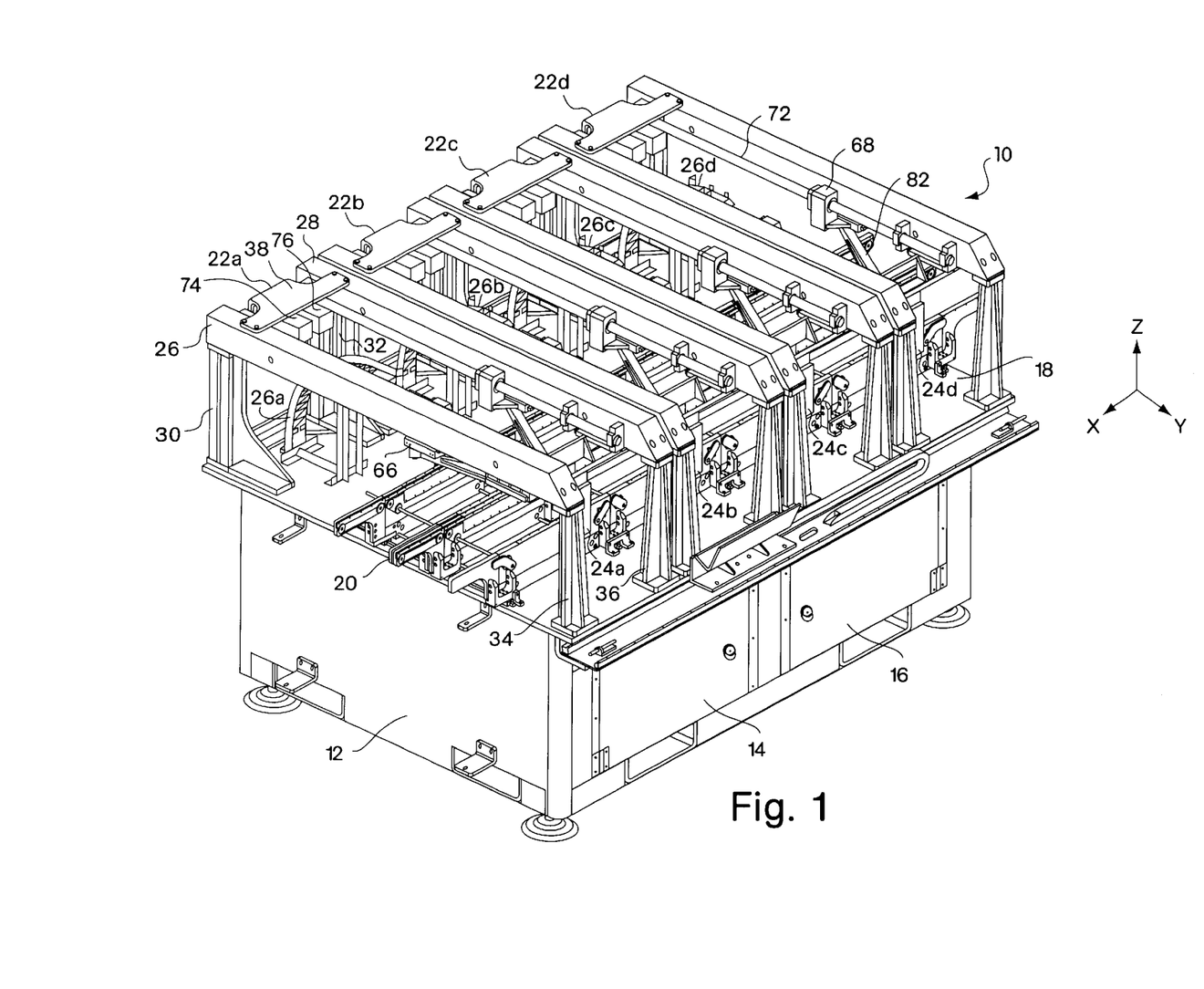
FIG. 1 is a perspective view of a multiple head dispensing system in accordance with one embodiment of the present invention.
Figure 2:
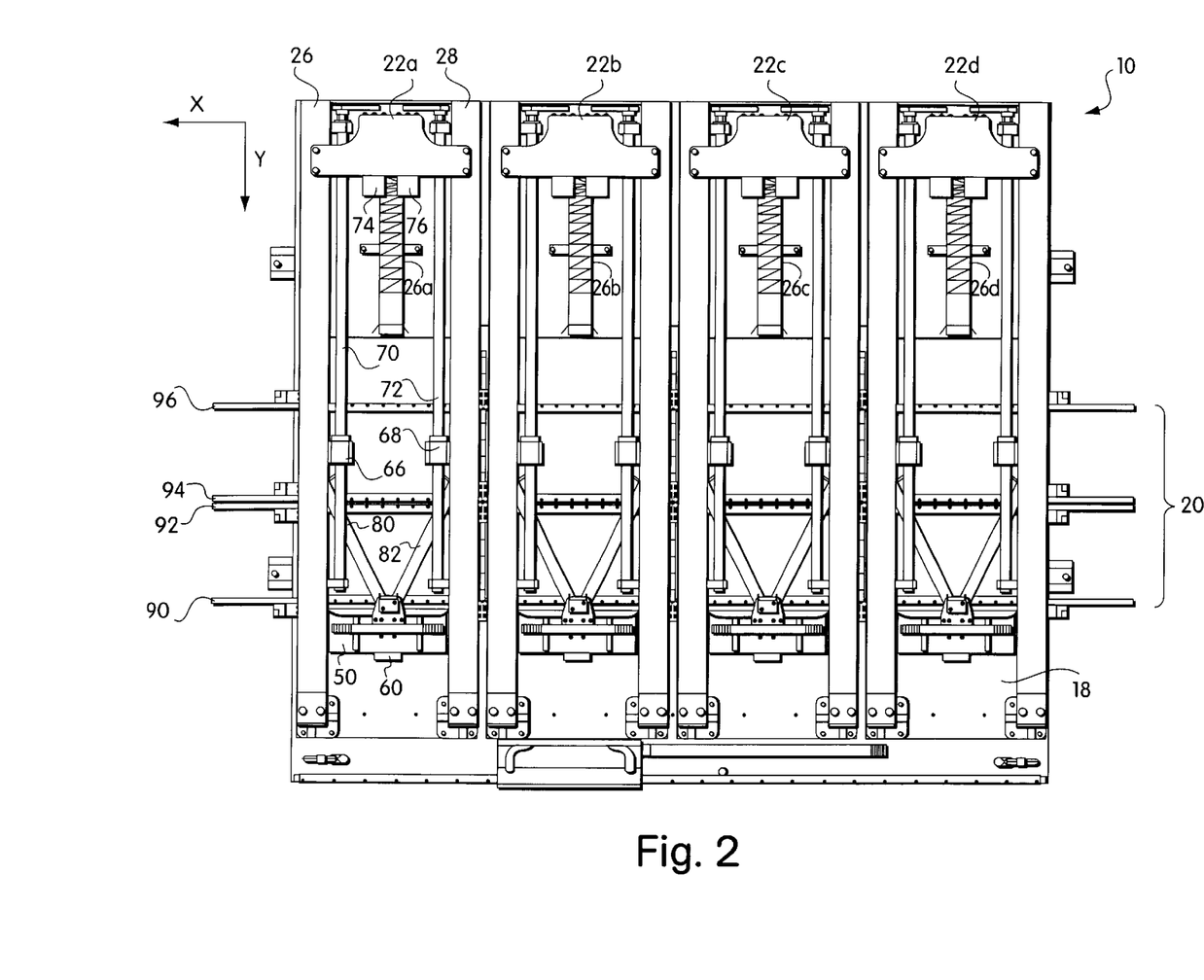
FIG. 2 is a top view of the dispensing system of FIG. 1.

One embodiment of a multiple head dispensing system 10 of the present invention will now be described with reference to FIGS. 1–5. FIG. 1 shows a perspective view of a multiple head dispensing system 10, which incorporates a rail position control system 300 for adjusting a plurality of rails 90, 92, 94 and 96 of a conveyor system 20 to accommodate a plurality of differently sized substrates in accordance with one embodiment of the present invention. For ease of illustration, the dispensing system 10 is shown in FIG. 1 without an outer covering. FIG. 2 shows a top view of the dispensing system 10. The dispensing system 10 can be similar to that shown and described in commonly owned U.S. Pat. No. 6, 007,631, which is hereby incorporated by reference in its entirety.

The dispensing system 10 includes a lower compartment 12 that is used to house electrical and pneumatic controllers (not shown) and a primary system controller (not shown). Access doors 14 and 16 are mounted on the front of the lower compartment to provide access to the equipment contained therein. The top of the lower compartment forms a work surface 18 on which a dual track conveyor 20 resides. Mounted to the work surface 18 are four x/y gantry systems 22a, 22b, 22c and 22d. Each of the gantry systems supports a dispensing head 24a, 24b, 24c and 24d, which dispenses material onto substrates loaded into the dispensing system using the conveyor system 20. In one embodiment of the present invention, at least one of the gantry systems 22a, 22b, 22c and/or 22d supports a camera 305 (FIGS. 4 and 5), which is used for inspection and alignment and is also used as part of a rail position control system 300 (FIGS. 4 and 5) for adjusting conveyor rails of the conveyor system 20 to accommodate differently sized substrates, as is described in further detail below.

The work surface 18 has four holes through which four cable troughs 26a, 26b, 26c and 26d pass. Each of the cable troughs are used to run cables from the control electronics and pneumatics in the lower compartment to each of the dispensing heads 24a, 24b, 24c and 24d. In one embodiment, the cable troughs are implemented using an E-Chain available from Igus Corporation.

The gantry systems 22a, 22b, 22c and 22d are substantially identical. Gantry system 22a will now be described in greater detail with reference to FIGS. 1 and 2, it being understood that gantry systems 22b, 22c and 22d are substantially identical to gantry system 22a, as mentioned above. Gantry system 22a provides positioning of the dispensing head 24a along the horizontal, orthogonal x and y axes shown in FIG. 1. In addition, gantry system 22a includes a motor for lowering the dispensing head in the vertical z direction.

Gantry system 22a includes two horizontal support members 26 and 28 and four vertical support members 30, 32, 34 and 36 coupled to the work surface 18. A motor support plate 38 is coupled between the horizontal support members 26 and 28 and is used to support two motors 74 and 76. The gantry 22a also includes a plate 50 that is slidably mounted to rails (not shown) disposed on the under side of each of the horizontal support members so that the motor support plate 38 can move along the y-axis. Dispensing head or pump 24a is mounted to a carriage 60, which in turn is slidably mounted to the plate 50 to permit movement of the dispensing head 24a along the x-axis.

Gantry system 22a further includes two nut blocks 66 and 68 that are slidably movable along the rails mounted under the horizontal support members 26 and 28. Each of the nut blocks is coupled to one of the motors 74, 76 through a respective lead screw 70, 72. The nut blocks can be separately driven by the motors using the lead screws to move the nut blocks along the y-axis. The carriage 60 is connected to each nut block 66, 68 with respective rigid trailing arms 80, 82 that are pivotally connected at one end to one of the nut blocks and at the other end to the carriage 60. As explained in greater detail in U.S. Pat. No. 5,903,125, which is hereby incorporated by reference in its entirety, the dispensing head 24a may be positioned along the x and y axes by moving the nut blocks along the y-axis using motors 74 and 76. Motors 74 and 76, as well as the z-axis motor coupled to the carriage 60, are controlled by the primary system controller located in the lower compartment.

The dispensing heads 24a, 24b, 24c and 24d may be implemented using a number of different dispensing heads or pumps including those disclosed in commonly owned U.S. Pat. No. 6,119,895, and in commonly owned U.S. Pat. No. 6,085,943, each of which is hereby incorporated by reference in its entirety.

The gantry systems 22a, 22b, 22c and 22d provide a significant advantage in the dispensing system 10. As described in U.S. Pat. No. 5,903,125, the ratio of the working area beneath the gantry system to the total width of the gantry system is much greater for the gantry systems described above than for typical x/y gantry systems. This reduces the time required to move a work product between work positions in the multiple head dispensing system, and also reduces the total footprint of the dispensing system 10.

Figure 3:
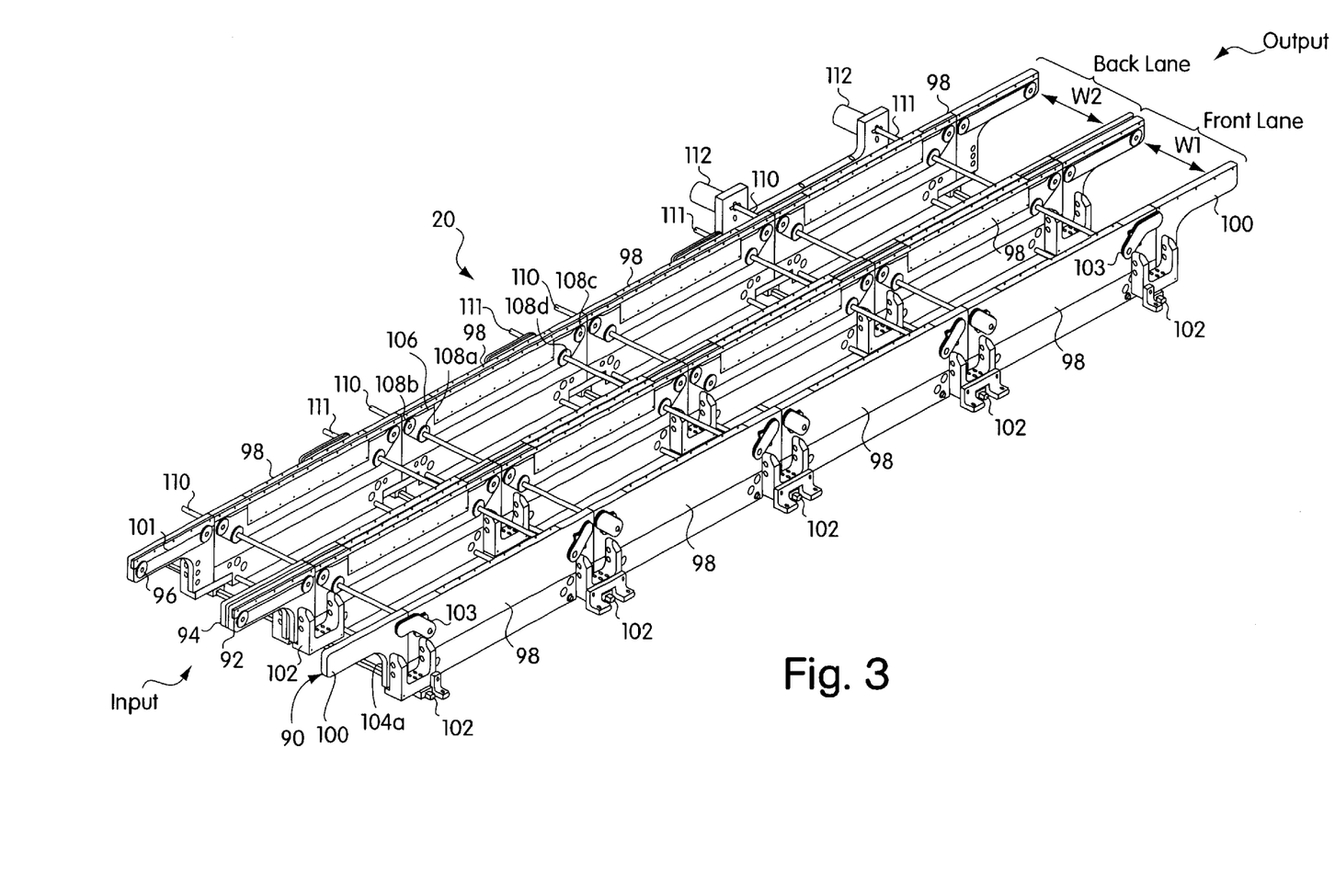
FIG. 3 is a perspective view of a conveyor system used in the dispensing system of FIG. 1.
Figure 4:
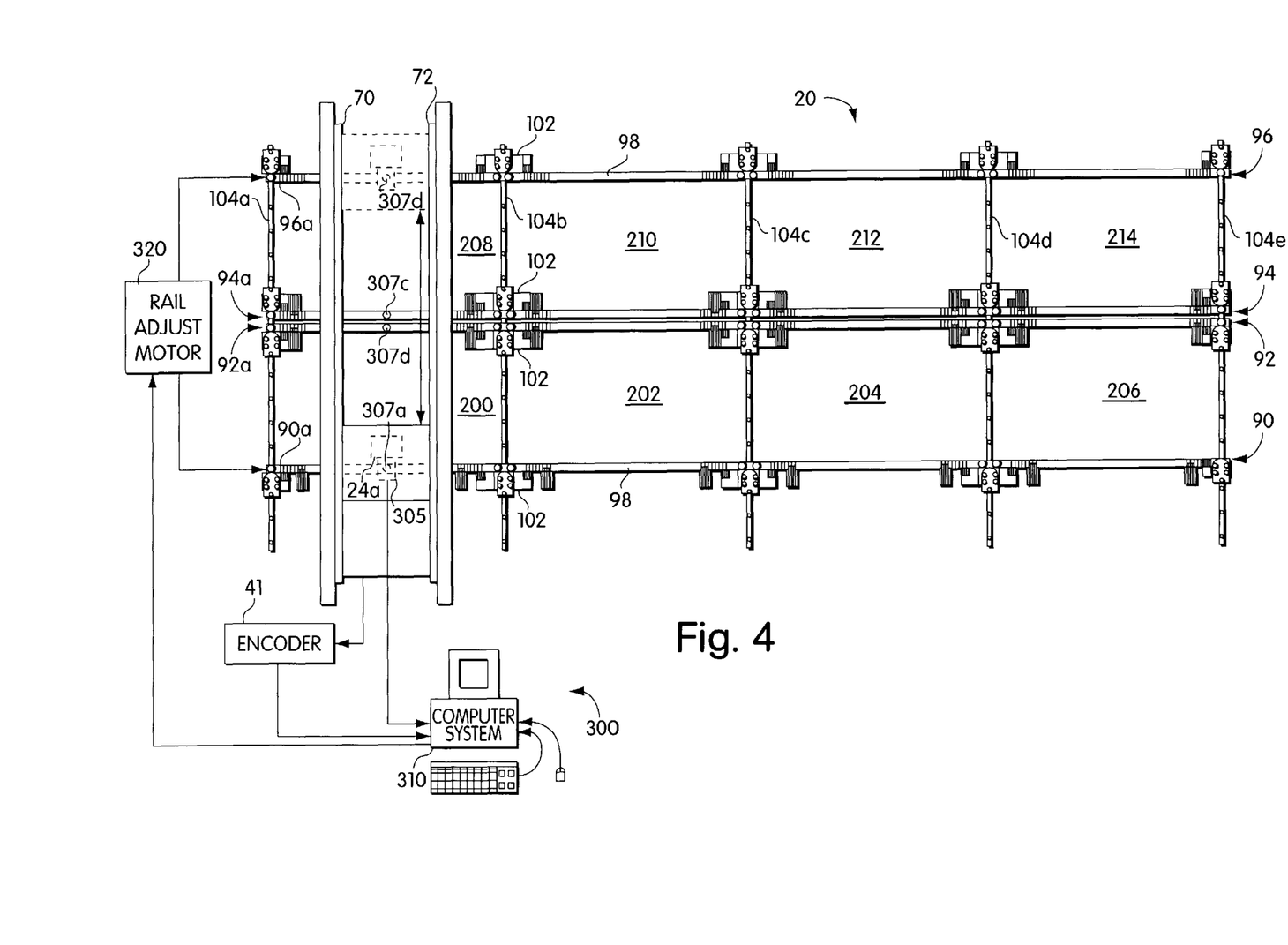
FIG. 4 is a top view of the conveyor system shown in FIG. 3, with a rail position control system for adjusting conveyor rails of the conveyor system to accommodate differently sized substrates.

The conveyor system 20 will now be described in greater detail with reference to FIGS. 3 and 4. FIG. 3 shows a perspective view of the conveyor system 20. FIG. 4 shows a top view of the conveyor system 20 with several elements removed for clarity. Additionally, FIG. 4 shows the rail position control system 300 for adjusting conveyor rails 90, 92, 94 and 96 of the conveyor system 20 to accommodate differently sized substrates. Although, the conveyor system 20 includes two lanes, it should be understood that in other embodiments of the present invention, a conveyor system may include more than two lanes or may include only a single lane.

The conveyor system 20 includes four rails 90, 92, 94 and 96 that define two lanes, which are respectively identified as a front lane and a back lane having lane widths w1 and w2. The front and back lanes are used for transporting substrates, such as circuit boards, integrated circuit carriers and other substrates into, through, and out of the dispensing system 10.

The conveyor system 20 further includes four substantially identical modular conveyor sections 98. The conveyor sections 98 define eight work areas 200, 202, 204, 206, 208, 210, 212, and 214, as shown in FIG. 4. Support blocks 102 are used to hold the conveyor sections 98 together and to hold the conveyor sections 98 in place on the work surface 18 of the dispensing system 10. Each of the rails 90, 92, 94 and 96 of the conveyor system 20 further include an end adapter 100, which is located at each end of each of the rails 90, 92, 94 and 96. The rails 90, 92, 94 and 96 are connected by tracks or cross-members 104a, 104b, 104c, 104d and 104e, which support and hold the rails 90, 92, 94 and 96 in a substantially parallel alignment with respect to each other.

The front and back lanes of the conveyor system 20, which respectively include lane widths w1 and w2, may be adjusted by moving the rails 90, 92, 94 and 96 to different positions along the tracks or cross-members 104a, 104b, 104c, 104d and 104e. As a result of moving the rails 90, 92, 94 and 96 to different positions along the tracks or cross-members 104a, 104b, 104c, 104d and 104e, the lane widths w1 and w2 are also adjusted to accommodate differently sized substrates. In an embodiment, the width w1 of the front lane may be different than the width w2 of the back lane.

Each of the conveyor sections 98 of the conveyor system 20 further includes a conveyor belt 106 that may be implemented as a continuous belt consisting of black neoprene over a cotton cord or may be implemented as a series of links. The conveyor belt 106 is wrapped around four pulleys 108a, 108b, 108c and 108d. A total of eight drive shafts, four drive shafts 110 and four drive shafts 111, are used to operate the conveyors. Each of the drive shafts is coupled to its own motor 112 to allow independent operation of each pair of conveyor sections. Operation of each of the motors is controlled by the primary system controller. For simplification, only two of the motors 112 are shown in FIG. 3.

Four drive shafts 110 are used to drive the conveyor segments in the back lane, and four drive shafts 111 are used to drive the conveyor segments in the front lane. For uniformity and ease of manufacturing, all eight drive shafts are substantially identical, and each of the drive shafts 110 extends through all four rails. Cogs are selectively added to the lower pulleys 108*a* and 108*d* to cause the pulleys to rotate with the drive shafts. In the conveyor system 20, for all conveyor sections 98 in the back lane, the lower pulleys closest to the input side of the conveyor system include a cog, and the lower pulleys closest to the output side of the conveyor system do not have a cog. For all conveyor sections 98 in the front lane, the lower pulleys closest to the input side of the conveyor system do not include a cog, and the lower pulleys closest to the output side of the conveyor system do include a cog. This implementation allows each pair of conveyor sections, defining one of the work areas, to operate independently. As understood by those skilled in the art, to meet specific application demands, the cogs may be arranged in other configurations.

Each of the end adapters 100 has a conveyor 101 that is coupled to the conveyor 106 of the adjacent conveyor section using an extension piece 103 so that each conveyor 101 is driven by the conveyor 106 of the adjacent conveyor section.

As described above, in one embodiment, all of the conveyor sections 98 are substantially identical. In addition, each conveyor section 98 is symmetrical about a vertical axis perpendicular to the direction of conveyor travel and passing through the middle of the conveyor section. This allows identical conveyor sections to be used on opposite rails of the same lane, and at any position (i.e., at the input end, output end, or in the middle) in any of the rails.

In the embodiment shown in FIG. 4, the rail position control system 300 includes at least one camera 305 that is mounted on a mounting surface, such as on the dispensing head 24*a*, which is located in close proximity to the conveyor system 20. As discussed above, the dispensing head 24*a* is coupled to lead screws 70 and 72, which are adapted to precisely move the dispensing head 24*a* and camera 305 along the y-axis. An encoder 41 is coupled to the lead screws 70 and 72 to determine the precise position of the dispensing head 24*a* and camera 305 along the y-axis. In other embodiments, other cameras that are similar to the camera 305 can be similarly mounted on the dispensing heads 24*b*, 24*c* or 24*d*.

The rail position control system 300 further includes a computer system 310 that is operatively coupled to the camera 305, to the encoder 41 and to a rail adjustment motor 320. The rail adjustment motor 320 is further coupled to at least one conveyor rail 90, 92, 94 and/or 96 of the conveyor system 20. In an embodiment, the rail adjustment motor 320 is coupled to the conveyor rails 90 and 96.

Each of the rails 90, 92, 94 and 96, as shown in FIG. 4, respectively include at least one registration mark 307*a*, 307*b*, 307*c* and 307*d*. In an embodiment, the registration marks 307*a*, 307*b*, 307*c* and 307*d* can each include at least one machined cavity, tapped hole with a screw threaded therein and/or a colored marking. The registration marks 307*a*, 307*b*, 307*c* and 307*d* located on each of the respective rails 90, 92, 94 and 96 can be uniquely positioned on the rails 90, 92, 94 and 96 to uniquely identify a particular rail 90, 92, 94 or 96. For example, the registration mark 307*a* can be centered at a position on the rail 90 that is three inches from a first end 90*a* of the rail 90, the registration mark 307*b* can be centered at a position on the rail 92 that is four inches from a first end 92*a* of the rail 92, the registration mark 307*c* can be centered at a position on the rail 94 that is five inches from a first end 94*a* of the rail 94 and the registration mark 307*d* can be centered at a position on the rail 96 that is six inches from a first end 96*a* of the rail 96. Tthe unique positioning of the registration marks allows the rail position control system to identify a rail based on the location of the registration mark on the rail.

Figure 5:
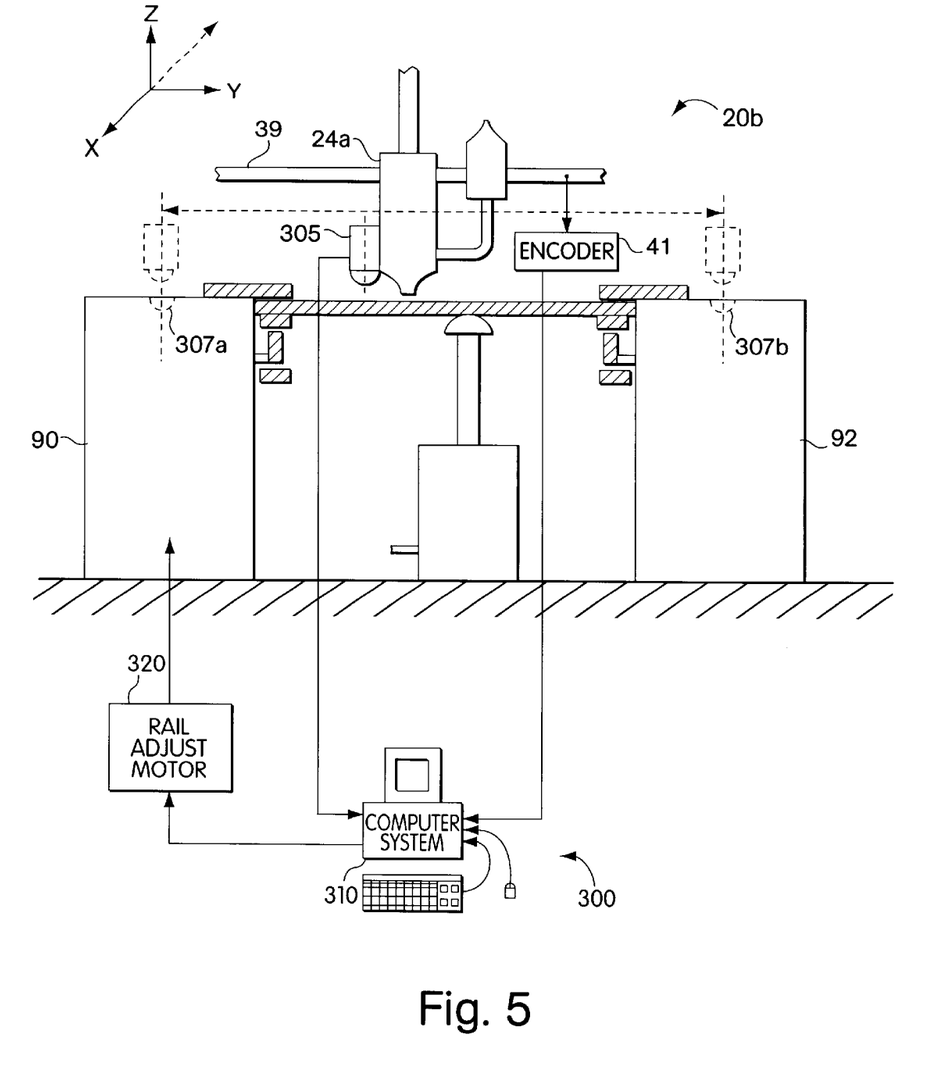
FIG. 5 is a side view of the conveyor system shown in FIG. 4.

FIG. 5 shows a simplified side view of a portion of the dispensing system 10 as well as a single lane (e.g. front lane) of the conveyor system 20 of FIG. 4. During operation of the rail position control system 300, as shown in FIG. 5, the camera 305 is moved along the y-axis by controlling the actuation of the lead screws 70 and 72 to move the dispensing head 24*a* and camera 305, which is mounted on the dispensing head, to center the camera on the registration mark 307*a*. The relative position of the camera, while centered on the registration mark 307*a*, is determined by the encoder 41 which provides a first position signal to the computer system 310 for processing. The camera 305 is again moved along the y-axis by controlling the actuation of the lead screw 39 to move the dispensing head 24*a* and camera 305 until the camera is centered on the registration mark 307*b*. The relative position of the camera 305 is again determined by the encoder 41 and a second position signal is provided to the computer system 310 in a similar manner as that described above. The computer system 310 processes the first and second position signals to determine a spacing located between the rails 90 and 92 or a rail spacing value. In other embodiments, one of the rails may be at a known fixed position, and the camera only looks at the registration mark on the movable rail to determine the lane width.

The computer system 300 further processes the rail spacing value and generates a rail spacing adjustment value. The rail spacing adjustment value is communicated, via control signals, to the rail adjustment motor 320 to actuate the motor to move the conveyor rail 90 of the conveyor system 20 a distance. The distance that the conveyor rail 90 is moved is equal to the rail position adjustment value, which adjusts the spacing located between the rails 90 and 92 of the conveyor system 20. Although the above described operation includes adjusting the spacing of rails 90 and 92 of the front conveyor lane of the conveyor system 20, a similar process may be used to adjust the spacing of rails 94 and 96 of the rear conveyor lane of the conveyor system 20.

In other embodiments of the present invention, the camera 305 may be used: to locate and view other registration marks located on substrates loaded into the dispensing system 10 for alignment purposes, to inspect substrates after material has been dispensed, or some other operation has been performed, and to identify a type of substrate loaded into the dispensing system 10.

In other embodiments of the present invention, the camera 305 mounted on the dispensing head 24*a* can be replaced with an optical transmitter/receiver unit. Further, the registration marks 307*a*, 307*b*, 307*c* and 307*d* can each be encoded with an optically communicable rail identifier value that uniquely identifies each of the respective conveyor rails 90, 92, 94 and/or 96. The rail identifier value associated with each rail can be communicated to the computer system 310, via the optical transmitter/receiver unit, to enable the computer system to identify a particular rail 90, 92, 94 and/or 96 and to determine the position of the particular rail 90, 92, 94 and/or 96 with respect to the other rails 90, 92, 94 and/or 96.

The computer system 310 can further respond to the values representing the respective widths w1 and w2 of the front and back lanes of the conveyor system 20 by controlling the rail width adjust motor 320 to move at least one rail 90, 92, 94 and/or 96 to adjust the lane widths w1 and/or w2 to accommodate different size substrates.

In embodiments described above, a camera is mounted on the same gantry system that supports a dispensing head. In other various embodiments, a camera may be mounted on a separate gantry or in a fixed position above the conveyor system. In one embodiment, the camera is mounted at a fixed position at a height above the conveyor system such that the camera is able to view the rails of a conveyor system to determine the distance between the rails using a single image.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. An apparatus for performing a task on a work piece, the apparatus comprising:
    an object that performs the task on the work piece;
    a work surface;
    a conveyor system mounted on the work surface and having at least a first rail and at least a second rail separated by a first space equal to a first conveyor lane width value, wherein the conveyor system is constructed and arranged to transport work pieces in the apparatus;
    a support structure coupled to the work surface, the support structure being coupled to the object to support the object over the conveyor system and including at least one gantry system having a slidably mounted platform adapted to securely hold the object and to move the object over work pieces on the conveyor system;
    at least one camera mounted on the support structure; and
    a processor coupled to the at least one camera,
    wherein the at least one camera is constructed and arranged to capture a first image of a first registration mark associated with the first rail and to capture a second image of a second registration mark associated with the second rail and to provide the first and second images to the processor, and
    wherein the processor is programmed to receive the first and second images and determine the first conveyor lane width value.

2. The apparatus of claim 1, wherein the first registration mark is located at a first predetermined position on the first rail and the second registration mark is located at a second predetermined position on the second rail.

3. The apparatus of claim 2, further including a motor coupled to the processor and to the first rail, the motor being adapted to receive and respond to control signals provided by the processor to move the first rail a distance based on a first conveyor lane adjustment value generated by the processor.

4. The apparatus of claim 3, wherein the platform is further adapted to securely hold the at least one camera and to move the at least one camera over the conveyor system.

5. The apparatus of claim 4, wherein the object includes a material dispensing head.

6. The apparatus of claim 5, wherein the conveyor system further includes:
    at least a third rail and at least a fourth rail separated by a second space equal to a second conveyor lane width value,
    wherein the at least one camera is constructed and arranged to capture a third image of a third registration mark associated with the third rail and to capture a fourth image of a fourth registration mark associated with the fourth rail and to provide the third and fourth images to the processor, and
    wherein the processor is programmed to receive the third and fourth images and determine the second conveyor lane width value.

7. The apparatus of claim 6, wherein the third registration mark is located at a third predetermined position on the third rail and the fourth registration mark is located at a fourth predetermined position on the fourth rail.

8. The apparatus of claim 7, wherein the motor is further coupled to the fourth rail, the motor being adapted to receive and respond to control signals provided by the processor to move the fourth rail a distance based on a second conveyor lane adjustment value.

9. The apparatus of claim 1, wherein the camera is movably mounted to the support structure to allow the camera to be moved under the control of the processor over the first registration mark and the second registration mark.

10. The apparatus of claim 1, wherein the object includes a material dispensing head.

11. The apparatus of claim 1, wherein the conveyor system further includes:
    at least a third rail and at least a fourth rail separated by a second space equal to a second conveyor lane width value,
    wherein the at least one camera is constructed and arranged to capture a third image of a third registration mark associated with the third rail and to capture a fourth image of a fourth registration mark associated with the fourth rail and to provide the third and fourth images to the processor, and
    wherein the processor is programmed to receive the third and fourth images and determine the second conveyor lane width value.

12. The apparatus of claim 11, wherein the third registration mark is located at a third predetermined position on the third rail and the fourth registration mark is located at a fourth predetermined position on the fourth rail.

13. The apparatus of claim 2, wherein the processor is programmed to identify the second rail based on the second predetermined position.

14. An apparatus that positions an object to perform a task on a work piece, the apparatus comprising:
    the object
    a work surface;
    a support structure positioned over the work surface and constructed and arranged to support the object over the work surface;
    a conveyor system mounted on the work surface and having at least a first rail and at least a second rail separated by a first space equal to a conveyor lane width;
    means for viewing the conveyor system and for determining the conveyor lane width,
        wherein the means for viewing the conveyor system and for determining the conveyor lane width includes a camera and includes means for moving the camera to a first position over the first rail and to a second position over the second rail.

15. The apparatus of claim 14, further including means for moving at least one of the first rail and the second rail to adjust the conveyor lane width.

16. The apparatus of claim 15, wherein the means for viewing the conveyor system and for determining the conveyor lane width includes means for determining a distance between the first position and the second position.

17. The apparatus of claim 14, wherein the second rail has a registration mark at a position on the second rail, and wherein the system further comprises means for identifying the second rail based on the position of the registration mark.

* * * * *